May 31, 1927.
A. VAN VEEN ET AL
1,630,282
HEAT BRANDING MACHINE
Filed Sept. 18, 1924
2 Sheets-Sheet 1
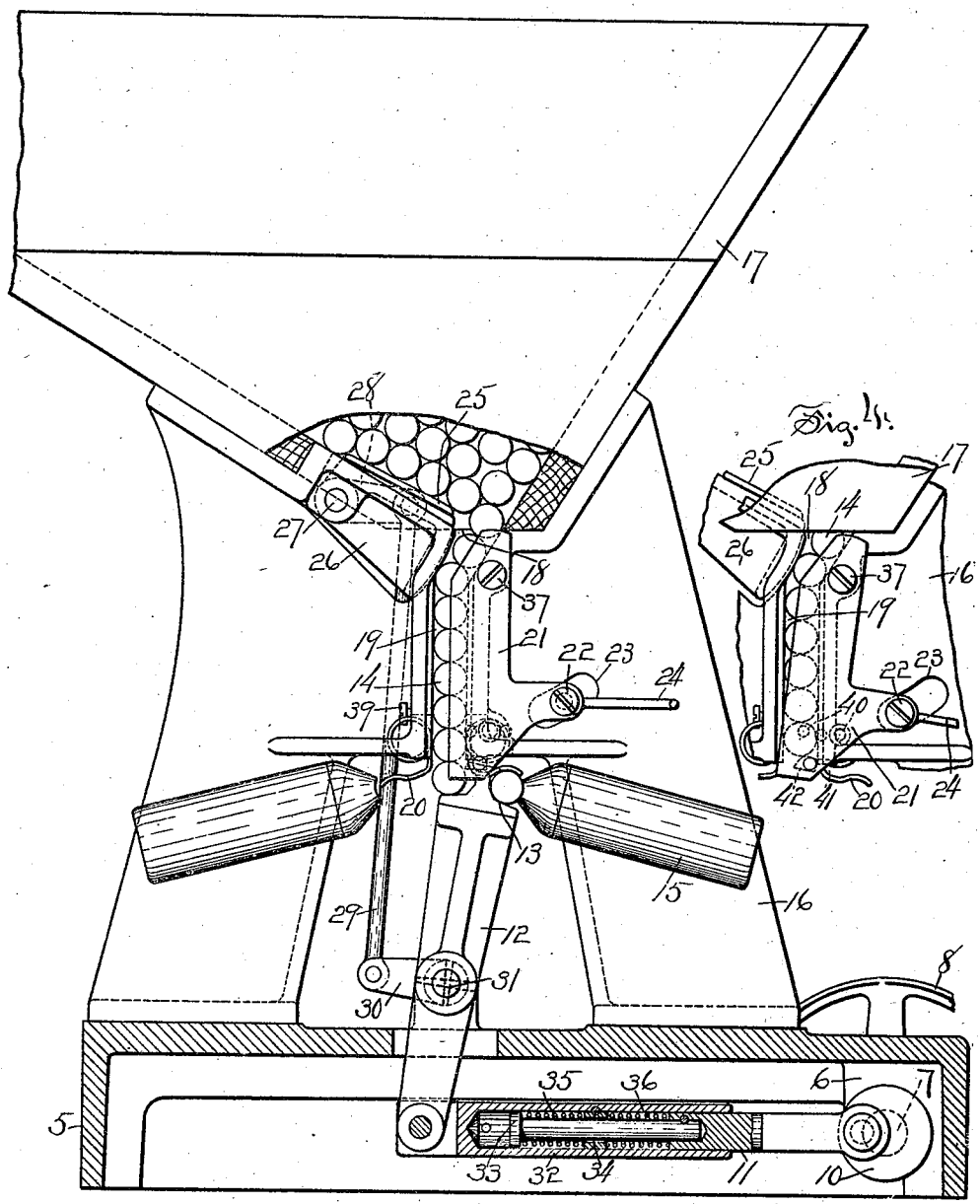

May 31, 1927.
A. VAN VEEN ET AL
1,630,282
HEAT BRANDING MACHINE
Filed Sept. 18, 1924    2 Sheets-Sheet 2
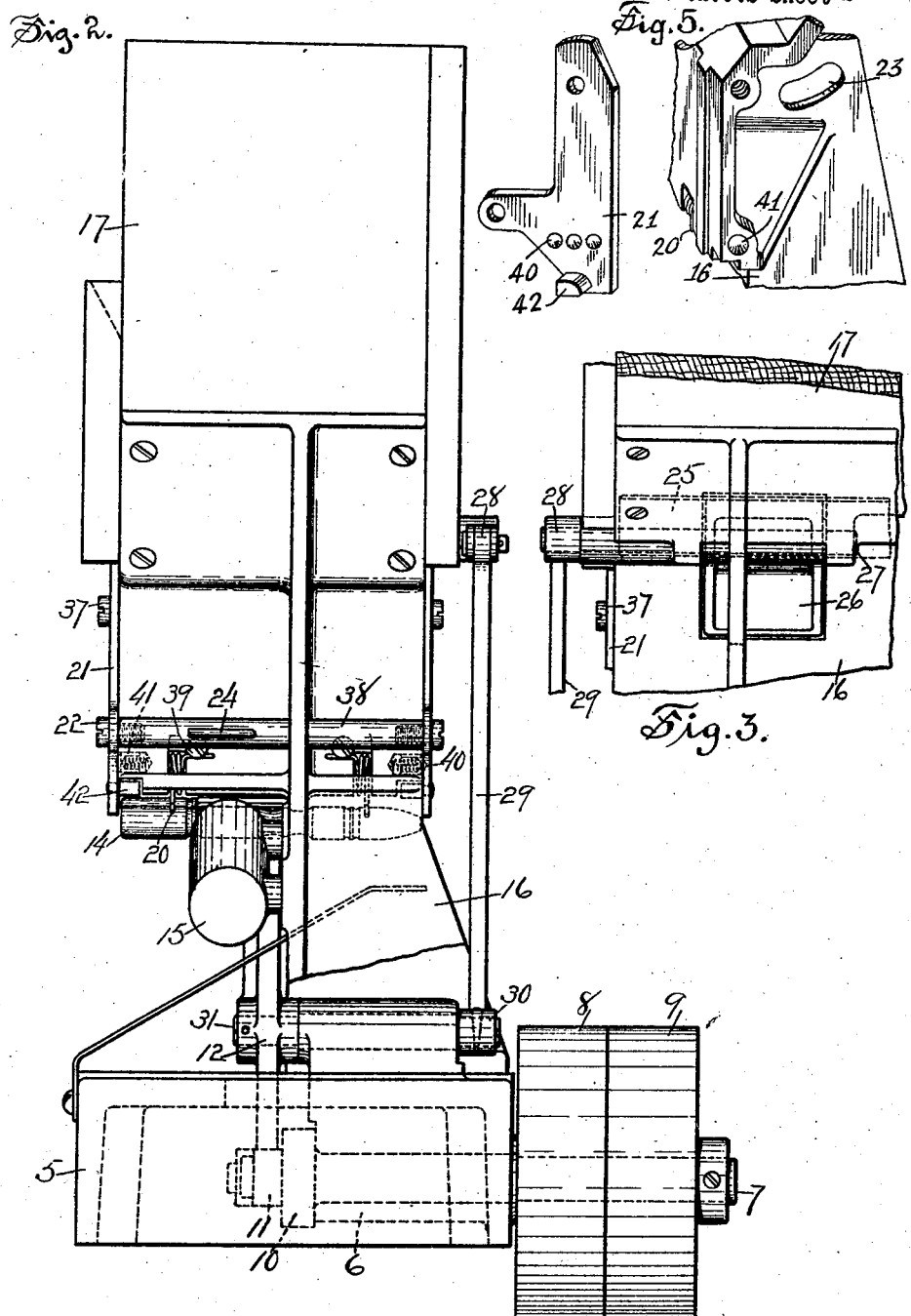
INVENTOR
Anton Van Veen
George A. Matteson
by
Arthur B. Jenkins
ATTORNEY Patented May 31, 1927.

1,630,282

UNITED STATES PATENT OFFICE.

ANTON VAN VEEN, OF HARTFORD, AND GEORGE F. MATTESON, OF ROCKY HILL, CONNECTICUT, ASSIGNORS TO THE FULLER BRUSH COMPANY, OF HARTFORD, CONNECTICUT, A CORPORATION OF CONNECTICUT.

HEAT-BRANDING MACHINE.

Application filed September 18, 1924. Serial No. 738,492.

Our invention relates to the class of machines that are employed to imprint matter more especially by means of heat upon various articles, the machine herein illustrated and described being especially equipped for operation upon handles of wood or other material, or upon similar articles, that are subjected to the action of heated branding devices, and an object of our invention, among others, is the production of a machine that shall automatically perform its various operations in a rapid and efficient manner.

One form of machine embodying our invention and in the construction and use of which the objects herein set out, as well as others, may be attained, is illustrated in the accompanying drawings, in which—

Figure 1 is a view in front elevation of a branding machine embodying our invention, with parts broken away to show construction.

Figure 2 is a view in side elevation.

Figure 3 is a detail view of the opposite side of a part of the lower portion of the hopper from that shown in Figure 2.

Figure 4 is a detail view illustrating the operation of the movable end plates for the hopper outlet.

Figure 5 is a detail isometric view of a fragment of the standard just underneath the hopper showing an end plate removed therefrom and reversed as to its position.

In the accompanying drawings the numeral 5 indicates a table that may be constructed of any suitable material and that may be provided with any suitable means of support, such table having a boss 6 within which a driving shaft 7 is mounted to be operated as by means of power applied through a belt (not shown) to fast and loose pulleys 8—9 respectively. A crank disc 10 is secured to the shaft 7 and is connected by a pitman with an article carrier and supporting lever 12 pivotally attached to the table 5, this lever having on opposite sides at one end article receiving recesses 13 for the deposit of articles, as handles 14, therein and by means of which lever said articles are carried into contact with branding devices 15 secured as to a standard 16 rising from the table 5. These branding devices may be of any suitable construction and they may be heated in any suitable manner, such means for heating being immaterial to the present invention. The operative ends of these branding devices will of course be supplied with proper characters or marks to be applied to the handles or other articles 14 when they are pressed into contact with such devices by the action of the lever 12.

A hopper 17 is secured to the upper end of the standard 16, this hopper being of any preferred construction and having an outlet opening in the form of an outlet slot 18 at its lower end communicating with an outlet passage 19 in the standard 16, and as shown in Figure 1 of the drawings. Article retainers and removers 20 comprise yielding members spaced apart for some distance, and as shown in Figure 2 of the drawings, such retainers and removers being adapted to receive handles or other articles 14 as they are presented to the branding devices by the lever 12, to hold such articles in position while being branded and to cause their removal from the recesses 13 in the lever after such articles have been branded. In the structure herein shown these retainers and removers consist of fingers extending from coiled springs secured as by means of headed screws 39 to the standard 16, each of these fingers being curved into a bend to receive the handles and retain them against movement as the lever 12 is being moved away from the branding devices, this permitting the handles to fall into any suitable receptacle (not shown) after the lever has moved sufficiently to permit disengagement of the articles therefrom.

The outlet passage 19 is closed at its opposite ends by end plates 21 each pivotally mounted at its upper end on screw studs 37, as shown in Figures 1 and 2 of the drawings. A screw stud 22 secures each plate to a bar 38 passing through a slot 23 in a web of the standard 16, as shown in Figures 2 and 4 of the drawing, the ends of such slots determining the amount of swinging movement of said plates. An operating rod 24 is secured to and extends from the bar 38 as a means for operating the end plates. It will be noted that this construction enables the end plates to be moved to uncover the ends of the outlet passage so that any handles or other articles may be removed from such passage when desired.

An agitator blade 25 is movably mounted in the bottom of the hopper at one side of but close to the outlet slot 18, this plate being attached to a swinging support 26 secured to a rock shaft 27 having a rocker arm 28 connected by a rod 29 with a rocking arm 30 secured to and projecting from the end of a pivot shaft 31 opposite to that to which the lever 12 is secured, said shaft being mounted in a bearing on the table 5, as shown in Figure 2 of the drawing.

The operation of the device will be readily understood, the lever 12, as it is rocked from side to side to receive the articles, as handles, alternately upon opposite sides thereof, presenting such articles first to one branding device 15 and then next to the other branding device. When one of such articles in one of the recesses in the lever is being moved toward a branding device an article in the recess on the opposite side of the lever is being released and will fall from such recess, and the operation of the device will be continuous so long as there are articles to be supplied from the hopper 17.

The pitman hereinbefore referred to as connecting the disc 10 and the lever 12 comprises two members 11 and 32, one of which is telescoped within the other. In the construction shown the member 11 extends into a pocket in the member 32, and the member 11 is reduced in diameter and terminates in a head 33, in the preferred form of construction this head being formed at one end of a rod, the other end of which is secured in a socket in the member 11, and as shown in Figure 1 of the drawings.

This rod projects through and is freely movable lengthwise within a collar 34 located within the pocket in the member 32 and secured to said member. Springs 35—36 are mounted upon the reduced portion of the member 11, the spring 35 being seated against the head 33 and the spring 36 being seated against the end of the member 11, the opposite ends of both of said springs thrusting against the collar 34 on opposite sides thereof. A result of this construction is that as the lever 12 is moved in opposite directions to carry a handle or other article 14 against a branding device 15, such article makes contact with the branding device before the disc 10 completes its effective movement to operate the pitman in either direction. After such contact of the articles with the branding device and while the disc 10 is completing such effective movement the springs 35 and 36 yield to permit the crank pin on the disc to pass the "dead center" with a result that during this interval the articles are pressed against the branding device with a pressure depending upon the strength of the springs 35 and 36 and for a length of time sufficient to insure a proper imprint of the characters on the branding devices upon such article. It will thus be seen that the pitman constructed as above described is double acting to exert pressure as to the articles upon opposite sides of the end of the lever 12.

In order to retain the end plates 21 in predetermined positions the back faces of said plates are provided with a number of depressions 40, as denoted by dotted lines in Figure 4, to receive spring pressed plungers 41, and a check 42 projects from the back of said plates to be positioned in the path of movement of the handles along the passage 19 when the plates are in a certain position, and as shown in Figure 4, the movement or feed of said articles to the lever 12 being thus checked or stopped. When the plates are in the position shown in Figure 1 the machine is ready for operation and when such plates are in a position opposite to that shown in Figure 4 the ends of the passage 19 are uncovered for the removal of articles therefrom.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim—

1. A branding machine comprising a hopper for supplying articles to be branded, a plurality of branding irons, and a carrier to receive said articles and present them alternately to the action of said branding irons.

2. A branding machine comprising means for supplying articles to be branded, a plurality of branding devices, and a carrier movable in opposite directions to receive said articles and present them successively to the action of said branding devices.

3. A branding machine comprising means for supplying articles to be branded, a plurality of branding devices, and a pivotally mounted carrier with its end movable in opposite directions to receive said articles and present them successively to the action of said branding devices.

4. A branding machine comprising means for supplying articles to be branded, a plurality of branding devices, and a carrier having a plurality of recesses to receive said articles and movable in opposite directions to receive said articles and present them successively to the action of said branding devices.

5. A branding machine comprising means for supplying articles to be branded, a pair of branding devices, and a carrier having a reciprocating movement between said branding devices to receive said articles and present them alternately to the action of said branding devices.

6. A branding machine comprising means for supplying articles to be branded, a pair of branding devices, and a pivotally mounted carrier having its end located for reciprocating movement between said branding devices to receive said articles and present them alternately to the action of said branding devices.

7. A branding machine comprising means for supplying articles to be branded, a plurality of branding devices, a carrier movably mounted for reciprocating movement to receive articles and present them successively to the action of said branding devices, and means for successively pressing said articles into contact with said branding devices.

8. A branding machine comprising means for supplying articles to be branded, a plurality of branding devices, a carrier movably mounted to receive said articles and present them successively to the action of said branding devices, and means for operating said carrier to press said articles into contact with said branding devices.

9. A branding machine comprising means for supplying articles to be branded, a plurality of branding devices, a carrier movably mounted to receive articles and present them successively to the action of said branding devices, and an operating member movable lengthwise to operate said carrier and having means to press said articles yieldingly into contact with said branding devices.

10. A branding machine comprising means for supplying articles to be branded, a plurality of branding devices, a carrier pivotally mounted to receive said articles and present them successively to the action of said branding devices, and an operating member movable lengthwise to operate said carrier and having means to press said articles into yielding contact with said branding devices.

11. A branding machine comprising means for supplying articles to be branded, a pair of branding devices, a pivotally mounted carrier having one end mounted for movement between said branding devices, said end having means to receive said articles and present them alternately to the action of said branding devices, and an actuator connected to the opposite end of said carrier and having means to press said articles into contact with each of said branding devices.

12. A branding machine comprising means for supporting articles to be branded, a pair of branding devices, a carrier having a reciprocating movement between said branding devices to present articles received thereby alternately into contact with said branding devices, and means for operating said carrier to press each of said articles into yielding contact with one of said branding devices.

13. A branding machine comprising means for supporting articles to be branded, a pair of branding devices, a carrier having a reciprocating movement between said branding devices to present articles received thereby alternately into contact with said branding devices, and a sectional member movable longitudinally to operate said carrier to press each of said articles into yielding contact with one of said branding devices.

14. A branding machine comprising means for supplying articles to be branded, a branding device, a carrier to receive said articles and present them to said branding device, and a member acting both to support said articles on said carrier and to remove them therefrom.

15. A branding machine comprising means for supplying articles to be branded, a branding device, a carrier to receive said articles and present them to said branding device, and a yieldingly mounted retainer acting both to support said articles on said carrier and to remove them therefrom.

16. A branding machine comprising means for supplying articles to be branded, said means including a passage having an outlet mouth for said articles and said passage also having an end opening, a movably mounted plate to cover and uncover the end opening of said passage, and means for retaining said plate in predetermined positions.

17. A branding machine comprising means for supplying articles to be branded, said means including a passage having an outlet mouth for such articles, a movably mounted plate to cover and uncover the end of said passage, and a check supported by said plate to prevent movement of articles along said passage in one position of said plate.

18. A branding machine comprising a hopper for supplying articles to be branded, an agitating member located in said hopper, branding devices, a carrier having a rocking movement to receive articles and present them to the action of said branding devices, and a rod connecting said carrier and agitator whereby the rocking movement of the carrier imparts rocking movement to the agitator.

ANTON VAN VEEN.
GEORGE F. MATTESON.